US006818265B2

(12) United States Patent
Wang

(10) Patent No.: US 6,818,265 B2
(45) Date of Patent: Nov. 16, 2004

(54) METHOD OF FABRICATION REAL FLOWER ARTISTIC STICKER

(76) Inventor: James Wang, PO Box 82-144, Taipei (TW)

( * ) Notice: Subject to any disclaimer, the term of this patent is extended or adjusted under 35 U.S.C. 154(b) by 0 days.

(21) Appl. No.: 10/326,541

(22) Filed: Dec. 23, 2002

(65) Prior Publication Data

US 2004/0121104 A1 Jun. 24, 2004

(51) Int. Cl.$^{7}$ .................................................. B32B 7/06
(52) U.S. Cl. ........................... 428/22; 428/24; 428/40.1
(58) Field of Search ........................... 428/40.1, 13, 22, 428/24; 156/57

(56) References Cited

U.S. PATENT DOCUMENTS 3,599,361 A * 8/1971 Bowman et al. .............. 40/711
5,662,970 A * 9/1997 Noguchi ...................... 428/24

* cited by examiner

*Primary Examiner*—Alexander S. Thomas
(74) *Attorney, Agent, or Firm*—Leong C. Lei

(57) ABSTRACT

A method of fabrication of real flower artistic sticker is disclosed and the method comprises the steps of (a) preparing flower material which has been pressed and arranging the flower material into a real flower artistic pattern; (b) coating a layer of modified acrylic emulsion to the bottom face of the real flower artistic pattern and mounting a releasing sheet onto the bottom face such that the releasing sheet can be stripped off when the modified acrylic emulsion is dried; (c) coating acrylic, an acrylite resin onto the top face of the real flower artistic pattern, and coating a silicone fluid liquid onto the top face of the real flower artistic pattern after the acrylite resin is dried; and mounting an acrylic resin for pressure sensitive adhesive, and thus the real flower transfer sticker is obtained. Before the sticker is used, the flower material is adhered onto the releasing paper, and in application, the releasing paper is removed and the real flower transfer sticker can be adhered onto a designated object.

1 Claim, 4 Drawing Sheets

METHOD OF FABRICATION REAL FLOWER ARTISTIC STICKER

BACKGROUND OF THE INVENTION (a) Technical Field of the Invention

The present invention relates to a method of fabrication real flower artistic sticker, and in particular to a method of forming sticker with real flower material such a leave, stalk and flowers. The sticker can be transferred and adhered onto a designated object.

(b) Description of the Prior Art

Conventional method of fabricating sticker is forming patterns onto a flat surface by printing, and therefore, this conventional method only provided planar shape sticker.

The recently available 3-D pressed flower sticker is formed by having a flower material between two planar thin films, and the edge of the flower material is cut and fixed into a specific shape. This method is not effective and the real flower material cannot be shown, and the flower material may not be easily preserved.

In view of the above, the drawbacks for the conventional stickers of the following types are as follows:

(a) for flower material enclosed by two layers of thin films:

The real flower material is enclosed and therefore the pattern may be damaged, and air may contact with the flower material, which causes the flower or leave to rot or discolor. As a result, long preservation is not possible.

(b) for planar printing sticker: The pattern is simple and lacks novelty.

Accordingly, it is an object of the present invention to provide a method of fabrication real flower artistic transfer sicker which can mitigate the above drawbacks commonly found in the conventional method of forming sticker.

SUMMARY OF THE INVENTION

Accordingly, it is an object of the present invention to provide a method of fabrication of real flower artistic sticker, wherein the flower material is real, and the flower material has different sizes and can be adhered onto any objects or article, and the sticker will not be stripped off from the object.

A further object of the present invention is o provide a method of fabrication of real flower artistic sticker, comprising the steps of:

(a) preparing flower material which has been pressed and arranging the flower material into a real flower artistic pattern;

(b) coating a layer of modified acrylic emulsion to the bottom face of the real flower artistic pattern and mounting a releasing sheet onto the bottom face such that the releasing sheet can be stripped off when the modified acrylic emulsion is dried;

(c) coating acrylic an acrylite resin onto the top face of the real flower artistic pattern, and coating a silicone fluid liquid onto the top face of the real flower artistic pattern after the acrylite resin is dried; and mounting an acrylic resin for pressure sensitive adhesive.

Yet a further object of the present invention is to provide a real flower artistic transfer sticker comprising a real flower artistic pattern having a bottom face mounted with a modified acrylic emulsion for adhesion with the single face releasing paper at the bottom layer, and the top face of the pattern is a layer of acrylic, an acrylite resin for the absorption of fibers of the flower material of the real flower artistic pattern for fixation; a layer of releasing oil; a bottom layer being a single face releasing paper mounted onto the bottom face of the real flower artistic pattern; and a transparent layer having a surface mounted with a transparent acrylic resin for pressure sensitive adhesive and adhered to the top face of the real flower artistic pattern.

Still another object of the present invention is to provide a real flower artistic sticker, wherein the sticker is used in ornamental design by sticking onto an object of any shape or a flat shape object.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention relates to a fabrication method for real flower artistic transfer sticker. In a preferred embodiment, petals, stalks, leaves, etc. flower material can be used.

Figure 1:
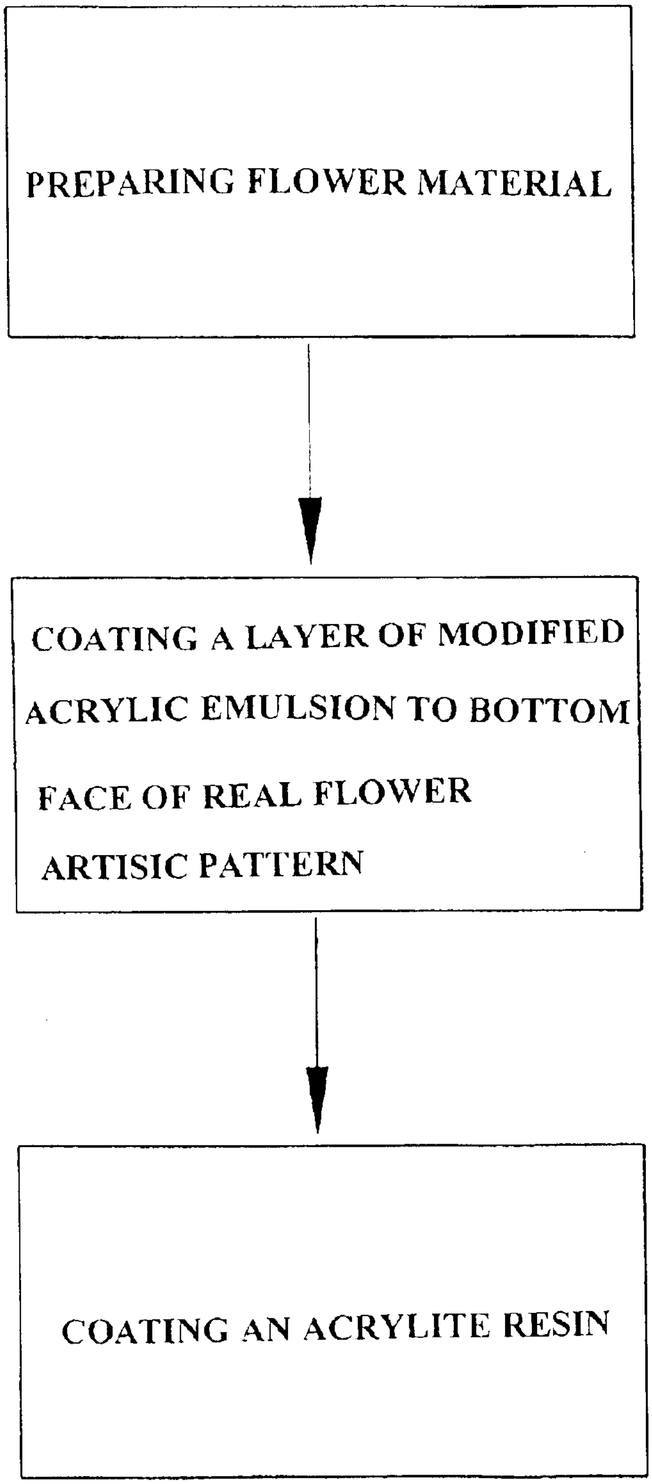
FIG. 1 is a flowchart showing a method of fabrication of real flower artistic sticker in accordance with the present invention.

Referring to FIG 1, there is shown the flowchart of a method of fabrication of real flower artistic sticker comprising the steps of:

(a) preparing flower material which has been pressed and arranging the flower material into a real flower artistic pattern 1;

(b) coating a layer of modified acrylic emulsion 2 to the bottom face of the real flower artistic pattern 1 and mounting a releasing sheet 3 onto the bottom face such that the releasing sheet 3 can be stripped off when the modified acrylic emulsion 2 is dried after about 10 to 20 minute, and the pattern 1 or a single leave, petal will form low adhesion configuration with the single face releasing paper (i.e., releasing type). The emulsion 2 which accepts pressing will have a strong adhesion force, facilitating mounting onto an object without dislocation or stripping off;

(c) coating acrylic, an acrylite resin 4 onto the top face of the real flower artistic pattern 1, and coating a silicone fluid liquid 5 onto the top face of the real flower artistic pattern 1 after the acrylite resin 4 of the real flower artistic pattern 1 is dried; and mounting an acrylic resin for pressure sensitive adhesive 6, which is a transparent layer. The releasing oil 5 and the releasing paper 3 allow the stripping off of the releasing paper 3 from the leaves, petals.

Figure 2:
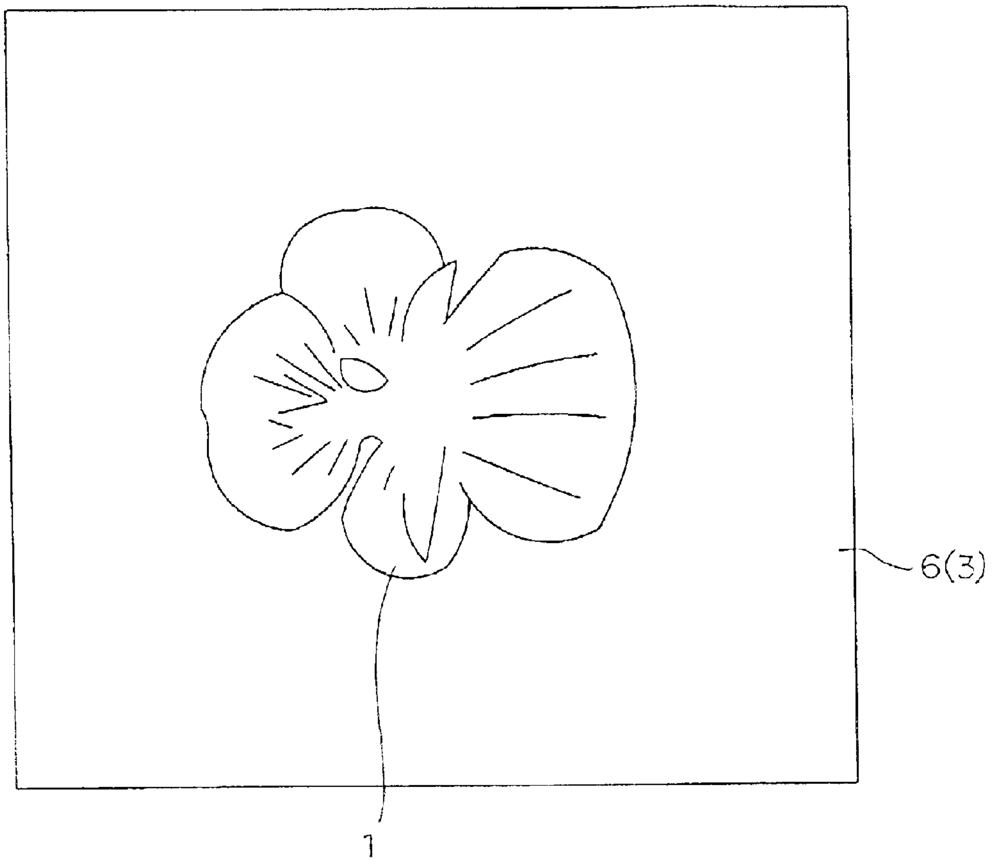
FIG. 2 is a perspective view of the product obtained in accordance with the method of the present invention.
Figure 3:
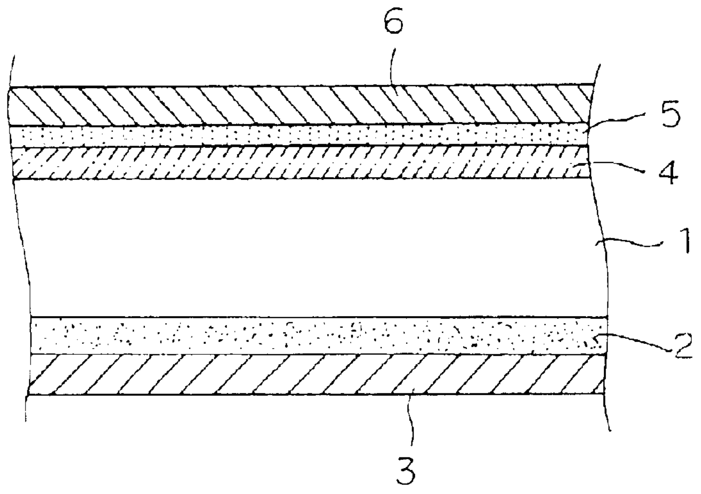
FIG. 3 is a sectional view of the product obtained in accordance with the present invention.

FIGS. 2 and 3 show a completed real flower artistic transfer paper.

In accordance with the present invention, the viscosity of the silicone fluids used for the real flower artistic pattern 1 and the transparent layer 6 is 200 CS so as to obtain the best isolation adhesion effect.

The viscosity of the acrylic resin for pressure sensitive adhesive (transparent layer) 6 is first adjusted and evenly coated onto the transparent layer 6 so as to achieve the adhesion onto a releasing paper 3.

By means of a pulling force, the transparent layer including transparent film 6 and the real flower artistic pattern 1 and the modified acrylic emulsion 2 pull to release form the single face releasing paper 3, and by means of the modified acrylic emulsion 2 can be transfer to a designated object 7 by pressing, and the application of the releasing soil 5 stripe off the transparent film 6 to form into a real flower artistic pattern. Thus a 3-D visual effect artistic ornamental design is obtained.

Figure 4:
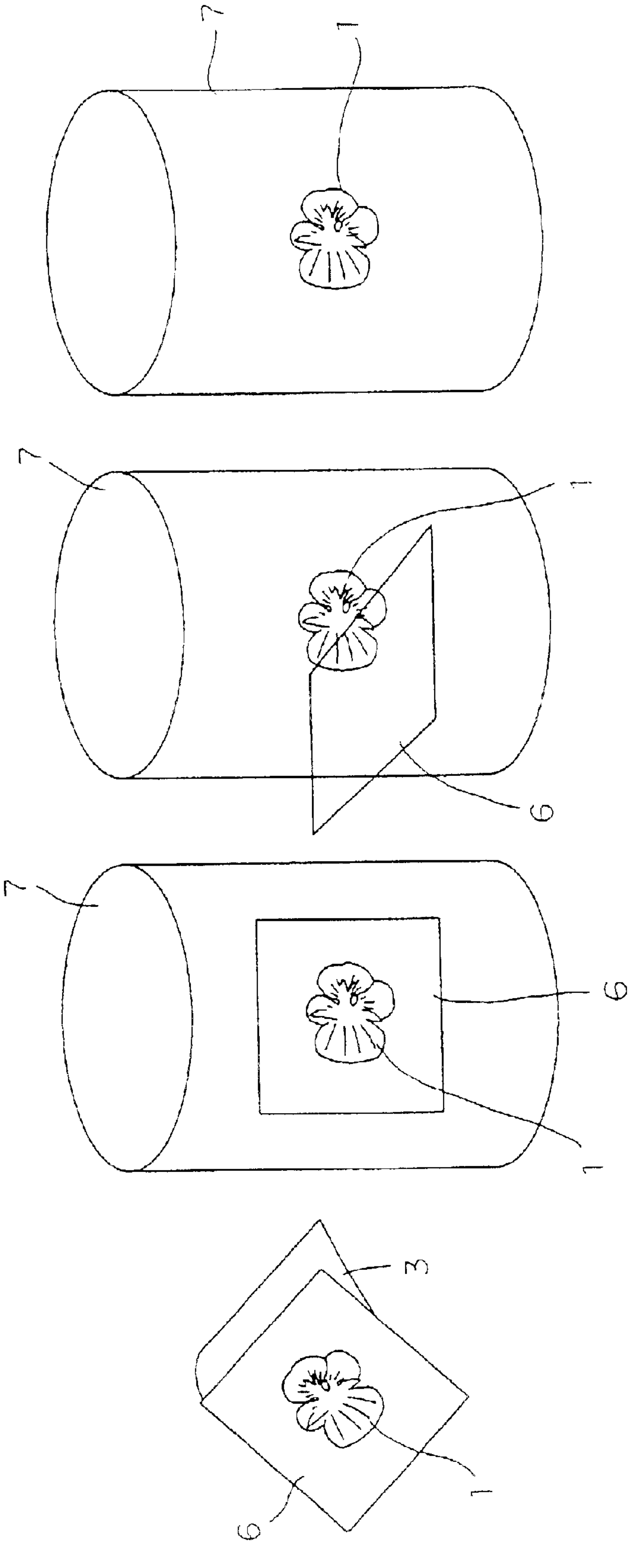
FIG. 4 are schematic views showing the implementation of product obtained in accordance with the present invention.

Referring to FIG. 4, there is shown a real flower artistic transfer sticker is applied onto an object. When a pulling force is applied, the releasing paper 3 is removed from the real flower artistic pattern 1 or a single leave, petals is adhered onto a designated object 7 by using press sensitive without stripping off. The transparent film 6 can be stripped off and thus the designated object 7 is adhered with a real flower artistic transfer paper.

The advantages in accordance with the present method are that (a) the sticker can be keep long and will not be easily damaged.

(b) the material can be easily obtained and the pattern can be formed in accordance with personal taste.

(c) complicated pattern can be obtained easily.

(d) a real touching feeling and the visual effect is good.

(e) the natural coloration of the real flower material can be preserved.

(f) any material and shape of the designated object can be mounted with the sticker without stripping off.

(g) the material is real and a chemical adhering method can be used on any articles.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A real flower artistic transfer sticker comprising:

a real flower artistic pattern having a bottom face mounted with a modified acrylic emulsion for adhesion with a single face releasing paper, and a top face of the pattern being coated with a layer of acrylic resin for absorption of fibers of flower material of the real flower artistic pattern for fixation;

a layer of releasing oil coated on the top face of the pattern;

a bottom layer being the single face releasing paper mounted onto a bottom face of the real flower artistic pattern; and a transparent acrylic layer on the layer of releasing oil.

* * * * *